United States Patent
Tofighbakhsh et al.

(10) Patent No.: US 10,368,207 B2
(45) Date of Patent: *Jul. 30, 2019

(54) CLOSED USER GROUPS

(71) Applicant: AT&T Intellectual Property II, L.P., Atlanta, GA (US)

(72) Inventors: Mostafa Tofighbakhsh, Cupertino, CA (US); Hossein Eslambolchi, Los Altos Hills, CA (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 127 days.

This patent is subject to a terminal disclaimer.

(21) Appl. No.: 14/874,517

(22) Filed: Oct. 5, 2015

(65) Prior Publication Data

US 2016/0029183 A1    Jan. 28, 2016

Related U.S. Application Data

(63) Continuation of application No. 13/848,088, filed on Mar. 21, 2013, now Pat. No. 9,185,572, which is a
(Continued)

(51) Int. Cl.
| | |
|---|---|
| *H04W 4/08* | (2009.01) |
| *H04W 8/18* | (2009.01) |
| *H04W 24/00* | (2009.01) |
| *H04L 12/26* | (2006.01) |
| *H04L 29/12* | (2006.01) |
| *H04L 29/08* | (2006.01) |
| *H04W 4/021* | (2018.01) |
| *H04W 80/04* | (2009.01) |
| *H04W 84/18* | (2009.01) |

(52) U.S. Cl.
CPC ............ *H04W 4/08* (2013.01); *H04L 43/10* (2013.01); *H04L 61/2007* (2013.01); *H04L 67/306* (2013.01); *H04W 4/021* (2013.01); *H04W 8/186* (2013.01); *H04W 24/00* (2013.01); *H04W 80/04* (2013.01); *H04W 84/18* (2013.01)

(58) Field of Classification Search
None
See application file for complete search history.

(56) References Cited

U.S. PATENT DOCUMENTS

| | | |
|---|---|---|
| 5,512,885 A | 4/1996 | Agestam et al. |
| 6,097,949 A | 8/2000 | Jung et al. |

(Continued)

*Primary Examiner* — Chrstopher M Crutchfield
*Assistant Examiner* — Thinh D Tran
(74) *Attorney, Agent, or Firm* — Scott P. Zimmerman, PLLC

(57) ABSTRACT

An arrangement for providing, on an ad hoc basis, a closed user group (CUG) among a collection of pre-defined IP network users. A set of intelligent access devices, dispersed through the IP network, constantly transmit a set of pings associated with the defines CUGs to discover those devices within its communication range. The discovered IP addresses for each device is thus constantly updated, allowing group members to remain in constant contact (emulating an "always on" connection). The users feels they are always connected with group members and thus have instant access to voice/data/video sessions—much like hot lines or "always on" connections.

20 Claims, 2 Drawing Sheets

Related U.S. Application Data continuation of application No. 12/381,185, filed on Mar. 9, 2009, now Pat. No. 8,432,904, which is a continuation of application No. 10/980,933, filed on Nov. 4, 2004, now Pat. No. 7,532,607.

(56) References Cited

U.S. PATENT DOCUMENTS

| | | |
|---|---|---|
| 6,628,937 B1 | 9/2003 | Salin |
| 7,337,221 B2 * | 2/2008 | Radi .................... H04L 41/5061 379/201.02 |
| 8,184,603 B2 | 5/2012 | Waylett et al. |
| 8,503,340 B1 | 8/2013 | Xu |
| 2002/0037736 A1 * | 3/2002 | Kawaguchi ............. H04W 4/08 455/518 |
| 2002/0095488 A1 * | 7/2002 | Primak ............... H04L 12/1868 709/223 |
| 2002/0131407 A1 | 9/2002 | Muhonen |
| 2002/0147611 A1 * | 10/2002 | Greene ............ G06Q 10/06311 705/1.1 |
| 2003/0017836 A1 | 1/2003 | Vishwanathan et al. |
| 2003/0139180 A1 | 7/2003 | McIntosh et al. |
| 2003/0149771 A1 * | 8/2003 | Wookey .............. H04L 12/1886 709/227 |
| 2003/0211859 A1 * | 11/2003 | Chen .................... H04L 12/189 455/518 |
| 2004/0116120 A1 | 6/2004 | Gallagher et al. |
| 2004/0208151 A1 | 10/2004 | Haverinen et al. |
| 2004/0219909 A1 | 11/2004 | Kennedy et al. |
| 2004/0230703 A1 | 11/2004 | Sukigara |
| 2004/0264435 A1 | 12/2004 | Chari et al. |
| 2005/0038876 A1 | 2/2005 | Chaudhuri |
| 2006/0002328 A1 | 1/2006 | Naghian |

\* cited by examiner

CLOSED USER GROUPS

CROSS-REFERENCE TO RELATED APPLICATIONS

This application is a continuation application of U.S. application Ser. No. 13/848,088 filed Mar. 21, 2013 and since issued as U.S. Pat. No. 9,185,572, which is a continuation application of U.S. application Ser. No. 12/381,185 filed Mar. 9, 2009 and since issued as U.S. Pat. No. 8,432,904, which is a continuation application of U.S. application Ser. No. 10/980,933 filed Nov. 4, 2004 and since issued as U.S. Pat. No. 7,532,607, with all applications incorporated herein by reference in their entireties.

TECHNICAL FIELD

The present invention relates to the formation of an ad hoc "network" between users of intelligent IP devices and, more particularly, to the capability of forming "closed user groups" (CUGs) over the IP network that are capable of sharing voice, data and video between group members.

BACKGROUND OF THE INVENTION

In today's world and beyond, it is becoming desirable to remain in contact with a pre-defined group of people at all times. For example, a family with members dispersed throughout the country—or around the world—desires to remain in contact with one another. Business associates, often traveling around different locations (or working from home), need to communicate with each other and often need to communicate as a "group" sharing information in the form of voice, data and/or video.

Various voice/text communication arrangements exist that utilize a wireless network architecture to provide voice communication between a pre-defined group of people, referred to as a "closed user group" or CUG. In these arrangements, a database in the network defines the members of a particular closed group by a user ID. Associated with each user ID may be set of "permissions" in terms of types of calls permitted or denied. The ability to "broadcast" a voice message to all users may be part of one such system. Text messaging, in real time, between various members or a closed "group" has also evolved over the Internet in the form of "instant messaging" or IM.

In all of these arrangements, as well as others prevalent in the prior art, an individual must either be at a fixed location where his/her communication device is located, or actively using a mobile device. Limitations exist in terms of the type of information that can be exchanged, as well as in the ability/inability to reach group members that may not necessarily be "plugged in" at that time.

Therefore, in today's world of desiring to remain in constant contact with certain people, a need remains for an improved, multimedia-capable arrangement for maintaining contact between members of a pre-defined group.

SUMMARY OF THE INVENTION

The need remaining in the prior art is addressed by the present invention, which relates to the formation of an ad hoc "network" between users of intelligent IP devices and, more particularly, to the capability of forming "closed user groups" (CUGs) over the IP network that are capable of sharing voice, data and video between group members.

In accordance with the present invention, an intelligent access device, coupled between an IP backbone and various communication devices, functions to define and track various pre-defined members of a group (hereinafter referred to as a "closed user group"). The intelligent device includes a database defining each member of each separate group and constantly "pings" these members to maintain a current IP address. Therefore, as long as a group member remains in the vicinity of a network node, the member will have access to all group communications.

It is an aspect of the present invention to provide a virtual "always on" network for the closed user group members. Both fixed and mobile users are periodically discovered by the intelligent access devices and thus enabled for instant communication with various other group members.

An intelligent access device used in this inventive arrangement functions to perform continuous discovery of group members and includes a database of customer profiles, including elements such as quality-of-service (QOS) for voice communication. Cluster management in terms of discovery, routing and signaling among user group nodes is also provided by the intelligent access device.

As an additional layer, authentication and security measures may be used to ensure that the membership of the group remains "closed". Various other advantages, aspects and modifications of the ad hoc closed user group concept of the present invention will become apparent during the course of the following discussion and by reference to the accompanying drawings.

BRIEF DESCRIPTION OF THE DRAWINGS

Referring now to the drawings.

DETAILED DESCRIPTION

In addition to conventional voice telephony service and data transmission, some of today's mobile communication systems provide a closed user group service. By means of the closed user group service, several different restrictions concerning the internal and/or external telecommunications can be defined for a selected group of subscribers. For example, available call restrictions may include the barring of incoming or outgoing calls, or barring calls to certain numbers within the group. Closed user groups are typically employed within companies, where it is desirable to restrict use of mobile devices for business-related calls only. In the call set-up process, closed user groups trigger additional checks, on the basis of which call set-up is either continued in conventional fashion or denied.

Figure 1:
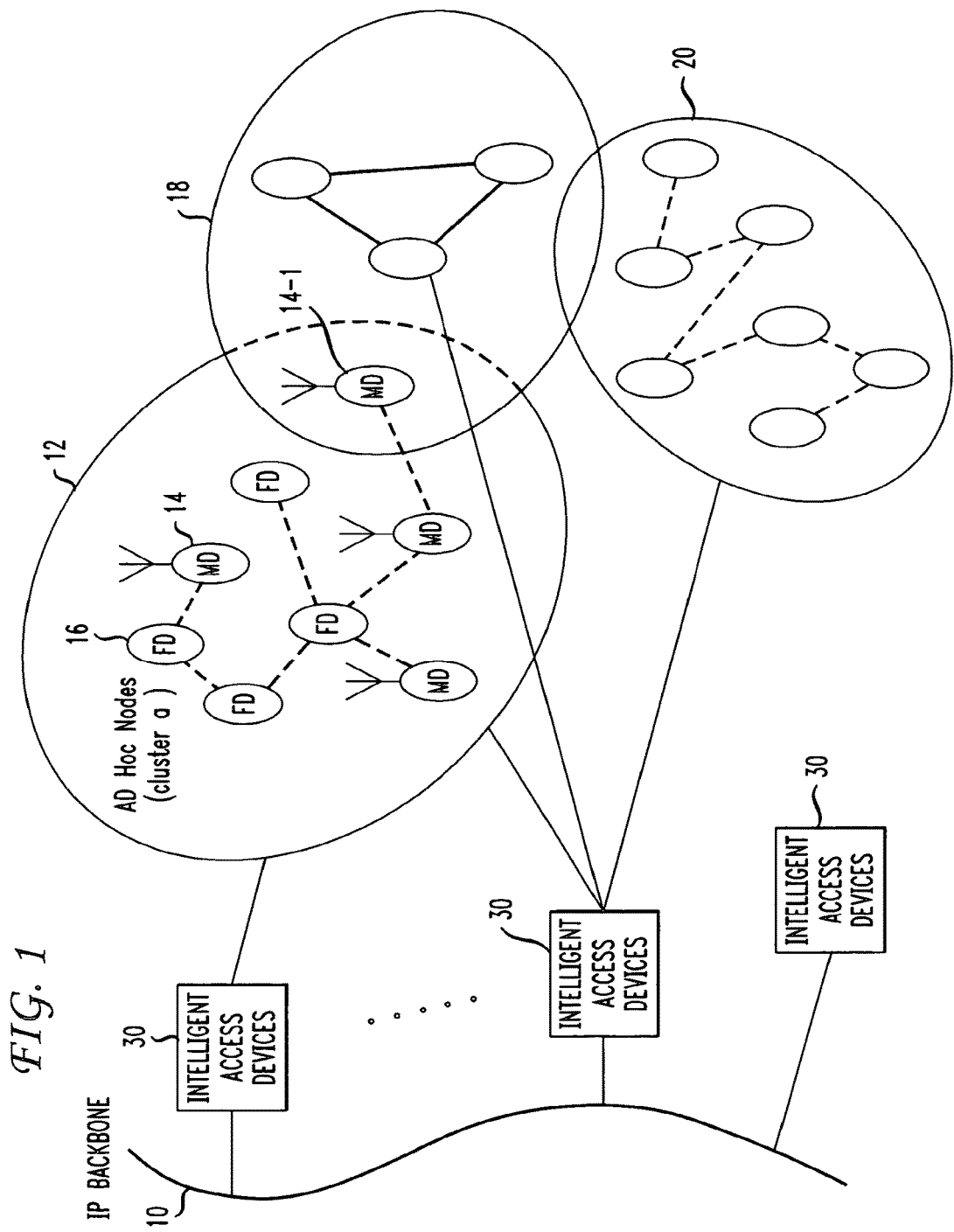
FIG. 1 illustrates an exemplary network architecture within which the inventive ad hoc closed user group methodology may function.

The present invention expands upon this basic premise of closed user groups and extends the utilization to ad hoc user groups in communication over the IP network to share, among group members, information in the form of voice, data and video. FIG. 1 illustrates an exemplary (simplified) architecture that may be utilized to provide this service in accordance with the present invention. As shown, the architecture comprises an IP backbone 10, which is connected to various IP network devices and sub-networks not germane to the subject matter of the present invention and not shown in the illustration. In this case, a plurality of separate user groups are identified. A first closed user group (CUG) 12 is shown as containing a plurality of mobile devices (MD) 14 and a plurality of fixed devices (FD) 16. This first CUG 12 may comprise a "business" CUG, where a number of fixed devices 16 are disposed at known work locations and the mobile devices 14 are carried by different personnel as they move from location to location.

In the particular example as illustrated in FIG. 1, an individual associated with mobile device 14-1 is also associated with a second CUG 18, where this second CUG may include family members that desire to remain in contact. A third CUG 20, in this case a stand-alone CUG, is also shown in FIG. 1.

In accordance with the present invention, a plurality of intelligent access devices 30 are configured to interface between IP backbone 10 and the plurality of CUGs 12, 18 and 20 in order to provide constant voice, data and video communication capabilities between the members of each group. As a result, the group members have an experience similar to being "always on" with the other members of his/her group. Indeed, these closed user groups can be thought of as separate, autonomous "ad hoc" micro-networks operation (in isolation) as clusters of micro-networks within the larger IP network.

Each cluster within a CUG consists of independent nodes that are enabled by intelligent access devices 30 to exchange voice, video conference and "multicast" services among the group members ("participants"). Intelligent access devices 30 function to constantly "discover" group members within their communication domain, by broadcasting a group-specific "ping" and "listening" for responses from group members. Thus, at any point in time, the various members of CUG 12 may be extremely disparate, in terms of geography, and yet maintain contact between each other. In contrast to the "follow me"-type of telecommunications well-known in the prior art and used to forward a call to the location of a calling party, the group "follows" each other and remains apprised of each other's location—without human intervention in terms of knowing where the members are, or the respective telephone numbers, emails or IP addresses where they can be reached.

Figures 2, 3:
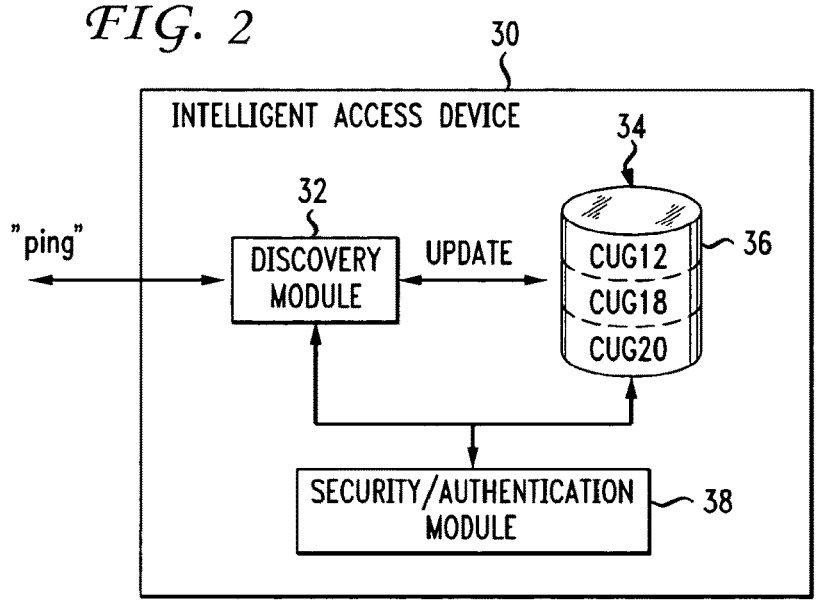
FIG. 2 is an exemplary embodiment of an intelligent access device for providing ad hoc wireless closed user group networking in accordance with the present invention.
FIG. 3 contains an exemplary database arrangement that may be used within an intelligent access device performing closed user group management in accordance with the present invention.

FIG. 2 illustrates an exemplary intelligent access device 30, including a discovery module 32 that functions to continuously broadcast a plurality of different "ping" signals, each ping associated with a separate one of the predefined CUGs. In response, to the pings, each intelligent access device 30 receives updated location information from the various members of each group. For example, the IP addresses of various group members are constantly updated as the members move from location to location. A separate database 34 is contained within intelligent access device 30 and comprises a plurality of separate partitions 36, each partition associated with different CUG. Database 34 thus interacts with discovery module 32 to update this IP address information. Intelligent access device may also include authentication and security module 38 to ensure that only authorized group members are permitted to communicate with one another. Discovery module 32 will also discover WiFi users at associated hotspots, further increasing the coverage capabilities of the inventive ad hoc network.

Each CUG participant, in accordance with the present invention, may chose from a variety of different services available to group members. In particular, in devices including video capabilities, the users may see each other on a defined "messenger" screen. At that time, they may elect to establish voice, video or data contact with the individuals identified on the messenger screen. Indeed, a user may choose to "automatically discover" and exchange information with other group members. FIG. 3 illustrates one exemplary database partition 36 identifying a plurality of different features associated with each group member. As shown, partition 36 includes a field 40 for storing the user ID of each group member. If desired, a password field 42 may be included to store authentication information associated with each group member, thus utilizing the information contained within security/authentication module 38 to verify the "membership". Critical to the operation of the present invention is the ability to continuously monitor and update the IP address associated with each group member. Field 44 of partition 36 is used to store/update this information. Additional fields, as mentioned above, may be included to allow for a variety of different services to be available to group members. For example, a field associated with a member's selected "class of service" (COS) for transmitting voice traffic over the IP network may be stored in field 46. A similar COS priority level may be associated with the member's data traffic and stored in field 48. Parameters of a particular service level agreement (SLA) may also be stored, as shown in field 50.

Conceptually, the inventive ad hoc closed user groups can be compared to an "instant messaging" service, except that the user groups of the present invention support voice and video, with the additional capability of proactively "discovering" users as they travel around in the global network. Therefore, as long as group members stay within a communication zone of an intelligent network access device, they will remain in contact with other group members. Such a service would thus support the vast majority of residential and business users who desire to remain connected most of the time with their friends or family, or "on the move" business partners.

The invention claimed is:

1. A method, comprising:
receiving, by a network device, an identifier of a closed user group;
querying, by the network device, an electronic database for the identifier of the closed user group, the electronic database electronically associating member Internet protocol addresses of closed user groups to different group-specific ping commands including the identifier of the closed user group;
identifying, by the network device from the electronic database, a group-specific ping command of the different group-specific ping commands that is electronically associated with the identifier of the closed user group;
identifying, by the network device from the electronic database, the member Internet protocol addresses that are electronically associated with the identifier of the closed user group; and
broadcasting, by the network device, the group-specific ping command as a locational request to each one of the member Internet protocol addresses associated with the identifier of the closed user group.

2. The method of claim 1, further comprising receiving an electronic response to the group-specific ping command, the response sent from a member address of the member Internet protocol addresses.

3. The method of claim 2, further comprising determining by the network device a current location associated with the member address.

4. The method of claim 3, further comprising storing the current location in the electronic database in association with the member address.

5. The method of claim 2, further comprising retrieving a profile associated with the member address.

6. The method of claim 2, further comprising sending a message to the member address.

7. The method of claim 1, further comprising closing the closed user group to new members.

8. A method, comprising:
receiving, by a network device, an identifier of a closed user group;
querying, by the network device, a network database for the identifier of the closed user group, the network database electronically associating member Internet protocol addresses to identifiers of closed user groups and different group-specific ping commands;
retrieving, by the network device from the network database, a group-specific ping command of the different group-specific ping commands that is electronically associated with the identifier of the closed user group;
retrieving, by the network device, the member Internet protocol addresses in the network database that are electronically associated with the identifier of the closed user group; and
broadcasting, by the network device, the group-specific ping command as a locational request to the member Internet protocol addresses that are electronically associated with the identifier of the closed user group.

9. The method of claim 8, further comprising receiving an electronic response to the group-specific ping command, the response sent from a member address of the member addresses.

10. The method of claim 9, further comprising determining a current location associated with the member address specified by the electronic response.

11. The method of claim 10, further comprising storing the current location in association with the member address.

12. The method of claim 9, further comprising retrieving a profile associated with the member address.

13. The method of claim 9, further comprising sending a message to the member address.

14. The method of claim 8, further comprising closing the closed user group to new members.

15. A method, comprising:
receiving, by a network device, an identifier of a closed user group;
querying, by the network device, a network database for the identifier of the closed user group, the electronic database electronically associating member Internet protocol addresses to identifiers of closed user groups to different group-specific ping commands and to locations;
retrieving, by the network device, the member Internet Protocol addresses from the network database that are electronically associated with the identifier of the closed user group;
retrieving, by the network device from the network database, a group-specific ping command of the different group-specific ping commands from the electronic database that is electronically associated with the identifier of the closed user group;
broadcasting, by the network device, the group-specific ping command as a locational request to the member Internet Protocol addresses retrieved from the electronic database that are electronically associated with the identifier of the closed user group;
receiving, by the network device, electronic responses to the group-specific ping command sent from the member Internet Protocol addresses associated with the identifier of the closed user group;
determining, by the network device, current locations specified by the electronic responses to the group-specific ping command; and
instructing the electronic database, by the network device, to electronically associate each one of the current locations to a corresponding one of the member Internet protocol addresses.

16. The method of claim 15, further comprising storing the current locations.

17. The method of claim 15, further comprising periodically broadcasting the group-specific ping command to the member Internet Protocol addresses.

18. The method of claim 15, further comprising sending a message to the member Internet Protocol addresses.

19. The method of claim 15, further comprising retrieving a profile associated with any of the member Internet Protocol addresses.

20. The method of claim 15, further comprising closing the closed user group to new members.

* * * * *